United States Patent [19]

Wolf et al.

[11] Patent Number: 5,227,454
[45] Date of Patent: Jul. 13, 1993

[54] HIGH TEMPERATURE RESISTANT, BENZOTHIAZOLE-CONTAINING POLYARYL ETHERS

[75] Inventors: Peter Wolf, Frankenthal; Gerhard Heinz, Weisenheim, both of Fed. Rep. of Germany

[73] Assignee: BASF Aktiengesellschaft, Ludwigshafen, Fed. Rep. of Germany

[21] Appl. No.: 764,858

[22] Filed: Sep. 24, 1991

[30] Foreign Application Priority Data

Sep. 27, 1990 [DE] Fed. Rep. of Germany ....... 4030511

[51] Int. Cl.$^5$ .................. C08G 75/32; C08G 8/02
[52] U.S. Cl. .................................. 528/125; 528/126; 528/128; 528/167; 528/171; 528/172; 528/174; 528/377; 528/378; 528/379; 524/592; 524/609; 524/610
[58] Field of Search ............... 528/125, 377, 126, 378, 528/128, 379, 174, 167, 172, 171; 524/592, 609, 610

[56] References Cited

U.S. PATENT DOCUMENTS 3,761,447  9/1973  Blaise et al. ..................... 528/172

FOREIGN PATENT DOCUMENTS 0178185  4/1986  European Pat. Off. .
0368006  5/1990  European Pat. Off. .
2067512  8/1971  France .
1361847  7/1974  United Kingdom .

OTHER PUBLICATIONS

CA114(16):144554d.

Primary Examiner—John Kight, III
Assistant Examiner—P. Hampton-Hightower
Attorney, Agent, or Firm—Keil & Weinkauf

[57] ABSTRACT

Soluble and/or meltable benzothiazole-containing polyaryl ethers with a glass transition temperature of above 150° C. and a melting point of up to 450° C. are composed essentially of repeat units of the formula I

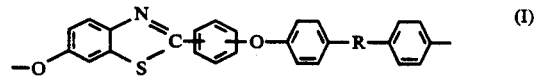 (I)

whose rings may be substituted by $C_1$-$C_6$-alkyl, $C_1$-$C_6$-alkoxy, aryl or halogen and where R is

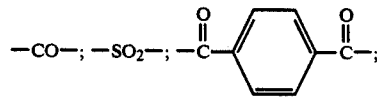

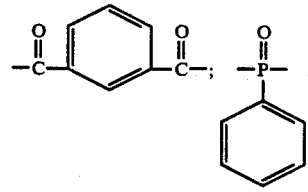

7 Claims, No Drawings

HIGH TEMPERATURE RESISTANT, BENZOTHIAZOLE-CONTAINING POLYARYL ETHERS

The present invention relates to soluble and/or meltable benzothiazole-containing polyaryl ethers and to a process for preparing same.

Polybenzothiazoles are high temperature resistant polymers which are also extremely stable chemically; the rigid structure of the wholly aromatic polybenzothiazoles leads to excellent mechanical properties. Since polybenzothiazoles are usually highly crystalline, their melting or softening points are usually above their particular decomposition temperatures. The consequence is a high heat resistance coupled, however, with the disadvantage that processing from the melt has hitherto not been possible.

For instance, the production of shaped articles from polybenzothiazoles using conventional processing techniques has hitherto not been possible; instead it is necessary to use costly sintering processes, restricted to a few fields of application.

Polyaryl ethers are less heat resistant than polybenzothiazoles, but owing to their thermoplasticity they are significantly easier to process. A disadvantage of wholly aromatic polyaryl ethers is their relatively low heat resistance (as measured in accordance with ASTM D 648).

An object of the present invention is to provide novel high temperature resistant plastics which offer a combination of the high heat resistance of polybenzothiazoles with the easy processing properties of polyaryl ethers. A more specific object is to provide benzothiazole-containing polyaryl ethers which are highly thermostable and meltable and can be processed with the aid of conventional techniques.

We have found that these objects are achieved by novel polymeric compounds where the chain units include not only those of benzothiazole but also those of aryl ethers, linked by flexible chain elements.

Benzothiazole-containing polyaryl ethers were previously described by A. Bouanane et al. (DE 21 38 830 of Mar. 2, 1972). However, the process specified by Bouanane et al. has some disadvantages. For instance, the process described in DE 21 38 830 gives only polymers which contain iminocarbonic thioester structures which may impair thermal and hydrolytic stability of the compounds mentioned. Nor are the materials obtained as described in DE 21 38 830 thermoplastic, so that in this respect they do not represent an improvement over polybenzothiazoles.

Accordingly, the present invention provides soluble and/or meltable benzothiazole-containing polyaryl ethers having a glass transition temperature of above 150° C. and a melting point of up to 450° C., composed essentially of repeat units of the formula I

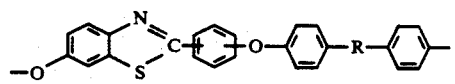
(I)

whose rings may be substituted by $C_1$–$C_6$-alkyl, $C_1$–$C_6$-alkoxy, aryl or halogen and in which R is

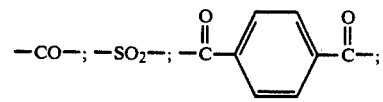

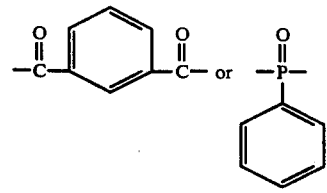

In the foregoing formula I, some of the benzothiazole moieties may be replaced to give polymers which besides units of structure I contain up to 99 mol % of units of structure II

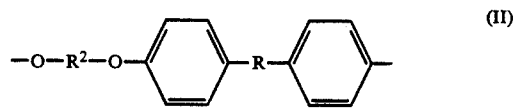
(II)

where $R^2$ is one of the following units:

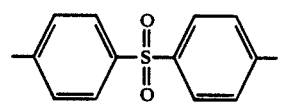

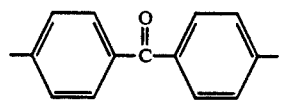

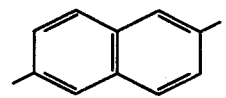

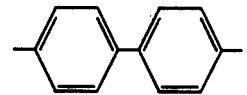

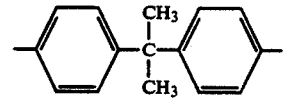

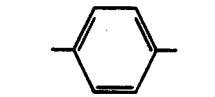

The present invention also provides for the preparation of novel monomers which can be used as starting materials for the polyaryl ethers described; these monomers are of structure VI, i.e. either structure VIa or structure VIb, or else in certain circumstances of a position-isomeric structure with the hydroxyl group ortho on the free phenyl (VIc)

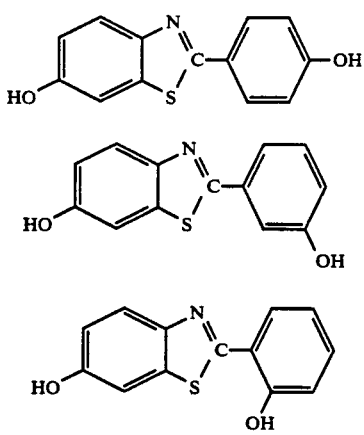

(VIa)

(VIb)

(VIc)

The novel polymers are obtained advantageously by nucleophilic aromatic functionalization of the novel benzothiazole-containing bisphenols VI with activated aromatic dihalides or aromatic dinitro compounds.

The polymerization is carried out in a polar aprotic solvent such as N,N-dimethylformamide (DMF), N,N-dimethylacetamide (DMA), N-methylpyrrolidone (NMP), N-methylcaprolactam, dimethyl sulfoxide (DMSO), sulfolane or diphenyl sulfone in the presence of a base such as an alkali metal or alkaline earth metal carbonate at a temperature within the range from about 140° to 320° C. which depends on the reactants and solvent used.

The solids content of the solution is in general from 10 to 50%. The reaction time depends on the desired degree of condensation and on the reactivity of the monomers used, but will in general be in the range from 0.5 to 15 hours. After the polycondensation has ended, any free phenolate end groups present may be stabilized by reaction with an arylating or alkylating agent, e.g. methyl chloride, at from 50° to 300° C., preferably at from 150° to 250° C.

The reaction is in general carried out under an inert gas, such as nitrogen or argon.

The salt formed from the base in the course of the polycondensation can be removed in a conventional manner. By replacing some of the benzothiazole-containing bisphenol with benzothiazole-free bisphenols, i.e. by incorporation of the abovementioned units II, it is possible to obtain copolymers whose properties can be tailored to the particular requirements, for example in respect of glass transition temperature or crystallinity, by varying the dihydroxybenzothiazole content within the range from 1 to 100%. The process of the present invention makes it possible, owing to the multiplicity of activated aromatic dihalides and aromatic dinitro compounds available, to introduce structural variations into the polymer chain in a simple manner.

Preparation of Benzothiazole-Containing Bisphenols

1) Preparation of 2-(p-hydroxyphenyl)-6-hydroxybenzothiazole a) Preparation of bis(6-methoxy-2-aminothiophenolato) zincate It is known how to prepare bis(6-methoxy-2-amino-thiophenolato) zincate, namely from 2-amino-6-methoxybenzothiazole by hydrolysis in aqueous KOH and reaction with zinc chloride.

b) Preparation of 2-(p-methoxyphenyl)-6-methoxybenzothiazole 25 g of bis(6-mathoxy-2-amino-thiophenolato) zincate are dissolved in 250 ml of dry DMA under nitrogen. The solution is cooled down to 0°–5° C. and a solution of 23 g of p-methoxybenzoyl chloride in 100 ml of dry DMA is added dropwise. The solution is stirred at room temperature for 1 hour and then heated at 140° C. for 3 hours. After cooling, it is poured into 1 l of ice-water, the mixture is filtered, and the filter residue is washed pH-neutral with 1 N sodium carbonate solution in water and dried at 80° C. under reduced pressure. The yield of 2-(p-methoxyphenyl)-6-methoxybenzothiazole is 33.6 g (93% of theory); melting point: 162°–164° C.

| Elemental analysis: | C | H | O | N | S |
|---|---|---|---|---|---|
| Found [%]: | 66.4 | 4.7 | 11.9 | 5.2 | 11.9 |
| Calculated [%]: | 66.40 | 4.83 | 11.79 | 5.16 | 11.82 | c) Preparation of 2-(p-hydroxyphenyl)-6-hydroxybenzothiazole 20 g of 2-(p-methoxyphenyl)-6-methoxybenzothiazole are refluxed in a mixture of 100 ml of glacial acetic acid and 200 ml of concentrated aqueous HBr with stirring. After 14 hours the mixture is cooled down to room temperature and filtered with suction, and the filter residue is washed with water and recrystallized from ethanol. The yield is 17.2 g (95% of theory); melting point: 284°–286° C.

| Elemental analysis: | C | H | O | N | S |
|---|---|---|---|---|---|
| Found [%]: | 64.1 | 3.7 | 13.3 | 5.8 | 13.3 |
| Calculated [%]: | 64.18 | 3.73 | 13.15 | 5.76 | 13.18 | d) Preparation of 2-(m-methoxyphenyl)-6-methoxybenzothiazole

The same method as described for 2-(p-methoxyphenyl)-6-methoxybenzothiazole can be used to obtain the corresponding meta isomer by replacing p-methoxybenzoyl chloride with m-methoxybenzoyl chloride. Yield: 91%; melting point: 155°–157° C.

e) Preparation of 2-(m-hydroxyphenyl)-6-hydroxybenzothiazole

The compound is obtained by dealkylation of 2-(m-methoxyphenyl)-6-methoxybenzothiazole by the method described in c). Yield: 93%; melting point: 280°–282° C.

| Elemental analysis: | C | H | O | N | S |
|---|---|---|---|---|---|
| Found [%]: | 64.1 | 3.8 | 13.2 | 5.9 | 13.1 |
| Calculated [%]: | 64.18 | 3.73 | 13.15 | 5.76 | 13.18 |

Preparation of poly(aryl ether-benzothiazoles)

The reported reduced viscosity ($\eta_{sp}/C$) was determined in 0.5% strength solution in sulfuric acid at 25° C.

EXAMPLE 1

Polycondensation of 2-hydroxyphenyl-6-hydroxybenzothiazole with 4,4'-difluorobenzophenone 24.33 g (0.1 mol) of 2-hydroxyphenyl-6-hydroxybenzothiazole are suspended in 300 g of molten diphenyl sulfone under nitrogen and admixed with 29 g of anhydrous potassium carbonate. The mixture is stirred at 180° C. for 30 minutes and is then admixed with 21.82 g (0.1 mol) of 4,4'-difluorobenzophenone. The temperature is raised to 250° C. for one hour, then to 280° C. for a further hour and finally to 310° C. for yet another hour. The reaction mixture is poured on to a metal surface, where it solidifies and the solid is comminuted. To remove the diphenyl sulfone it is then extracted with acetone, then stirred with a mixture of 500 ml of methanol and 50 ml of glacial acetic acid and filtered, and the filter residue is dried at 150° C. under reduced pressure. This gives 40.6 g (96%) of a polymer of structure I,1 as a colorless solid which has a reduced viscosity of 85 ml/g, a glass transition temperature ($T_g$) of 195° C. and a melting point of 391° C.

| Example | Halogen compound | $T_g$ [°C.] | $T_m$ [°C. %] | $\eta_{red}$ [ml/g] |
|---|---|---|---|---|
| 5 | 4,4'-difluorotriphenylphosphine oxide | 253 | — | 61 |

*Product has 2 melting points

EXAMPLE 6

Copolycondensation of 2-hydroxyphenyl-6-hydroxybenzothiazole with 4,4'-difluorobenzophenone and bisphenol A 12.164 g (0.05 mol) of 2-hydroxy-6-hydroxybenzothiazole, 11.415 g (0.05 mol) of bisphenol A and 29 g of anhydrous potassium carbonate are stirred in a mixture of ml of N-methylpyrrolidone and 50 ml of toluene are stirred in a nitrogen atmosphere under a water separator at 140° C. for 30 minutes. 22.252 g (0.102 mol) of 4,4'-difluorobenzophenone are added and stirring is continued at 140° C. for a further 4 hours. Toluene is then distilled off until the internal temperature of the reaction vessel is 160° C. Stirring is continued at that tem-

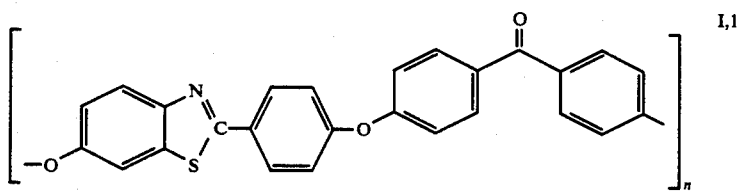

EXAMPLE 2

Polycondensation of 2-hydroxyphenyl-6-hydroxybenzothiazole with 4,4'-dichlorodiphenyl sulfone The method described in Example 1 is used to react 24.33 g (0.1 mol) of 2-hydroxyphenyl-6-hydroxybenzothiazole with 29 g of anhydrous potassium carbonate and 28.72 g (0.1 mol) of 4,4'-dichlorodiphenyl sulfone to obtain 46.0 g (98%) of a polymer of structure I,2 as a colorless solid having a reduced viscosity of 67 ml/g and a glass transition temperature ($T_g$) of 244° C.

perature for a further 6 hours. After cooling, the viscous suspension obtained is run into a mixture of 600 ml of methanol and 50 ml of glacial acetic acid. The copolymer forms a colorless precipitate, which is filtered off, washed with water and methanol and dried at 150° C. under reduced pressure.

This gives 39.95 g (96.5%) of a copolymer having a reduced viscosity of 60 ml/g, a glass transition temperature of 158° C. and a melting point of 308° C.

EXAMPLE 7

Copolycondensation of

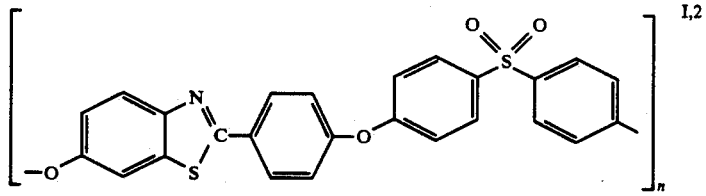

EXAMPLES 3 TO 5

The method of Example 1 is repeated to react 24.33 g (0.1 mol) of 2-hydroxyphenyl-6-hydroxybenzothiazole with 0.1 mol each of the following halogen compounds:

| Example | Halogen compound | $T_g$ [°C.] | $T_m$ [°C. %] | $\eta_{red}$ [ml/g] |
|---|---|---|---|---|
| 3 | 1,3-bis(p-fluorobenzoylbenzene) | 194 | 389 | 77 |
| 4 | 1,4-bis(p-fluorobenzoylbenzene) | 189 | 341/407* | 88 |

2-hydroxyphenyl-6-hydroxybenzothiazole with 4,4'-dichlorodiphenyl sulfone and 4,4'-dihydroxydiphenyl sulfone 6.082 g (25 mmol) of 2-hydroxyphenyl-6-hydroxybenzothiazole, 25.025 g (100 mmol) of 4,4'-dihydroxydiphenyl sulfone and 36 g of anhydrous potassium carbonate are stirred in a mixture of 200 ml of N-methylpyrrolidone and 80 ml of toluene in a nitrogen atmosphere under a water separator at 140° C. for 30 minutes. 36.468 g (127 mmol) of 4,4'-dichlorodiphenyl sulfone are added and stirring is continued at 140° C. for a further 4 hours. Toluene is then distilled off until the internal temperature of the reaction vessel is 160° C. Stirring is continued at that temperature for a further 6 hours. After cooling, the viscous suspension obtained is run into a mixture of 600 ml of methanol and 50 ml of glacial acetic acid. The copolymer forms a colorless precipitate, which is filtered off, washed with water and methanol and dried at 100° C. under reduced pressure.

This gives 57.2 g (99%) of a copolymer having a reduced viscosity of 69 ml/g and a glass transition temperature of 220° C.

We claim:

1. A soluble or meltable benzothiazole-containing polyaryl ether having a glass transition temperature of above 150° C. and a melting point of up to 450° C., consisting essentially of repeat units of the formula I

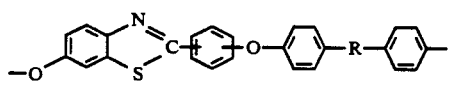
(I)

whose rings may be substituted by $C_1$-$C_6$-alkyl, $C_1$-$C_6$-alkoxy, aryl or halogen and in which R is

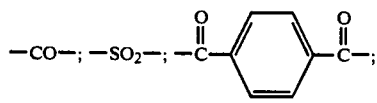

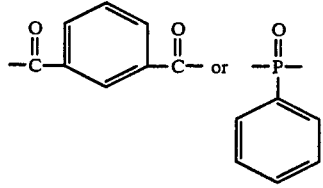

2. A polyaryl ether as claimed in claim 1 consisting essentially of
from 1 to 100 mol % of units of the formula I and up to 99 mol % of repeating units of the formula II

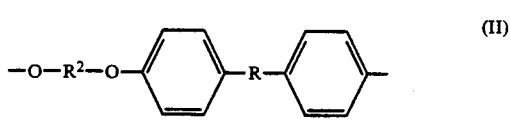
(II)

where R is as defined in claim 1 and $R^2$ is

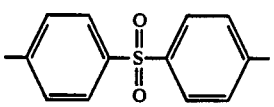

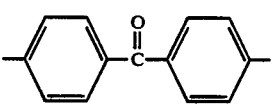

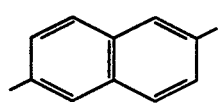

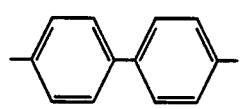

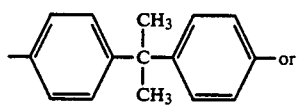

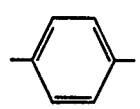

3. A polyaryl ether as claimed in claim 1 consisting essentially of repeat units of the formula IV

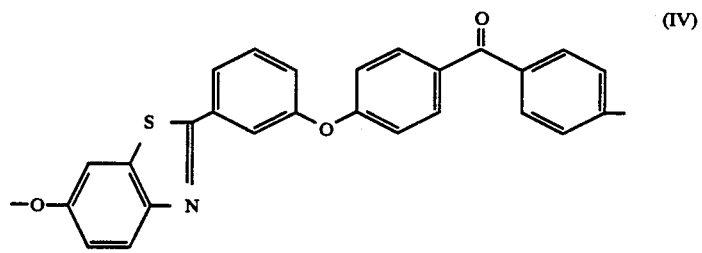
(IV)

4. A polyaryl ether as defined in claim 1, consisting essentially of repeating units of formula IIIa or IIIb

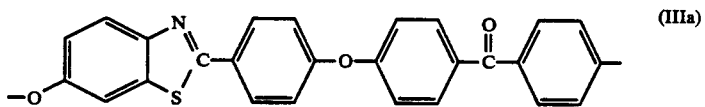
(IIIa)

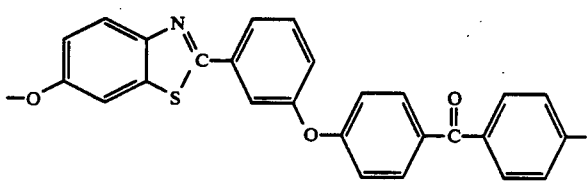
(IIIb)

5. A polyaryl ether defined in claim 1, consisting essentially of from 1 to 100 mol. % of units of the formula (IIIa) or (IIIb)

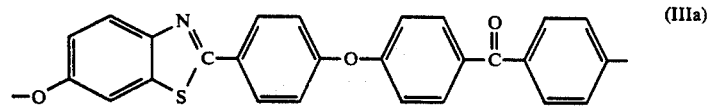
(IIIa)

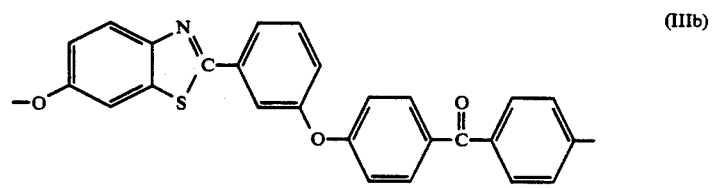
(IIIb)

and up to 99 mol. % of repeating units of the formula (IIa)

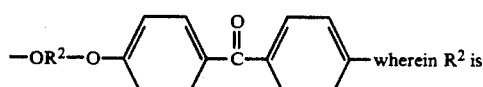 wherein $R^2$ is

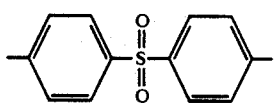

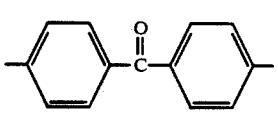

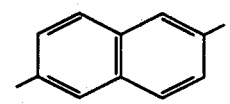

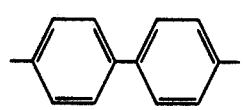

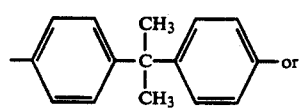 or

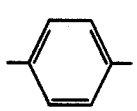

6. A process for preparing a polymer as defined in claim 1, which comprises polycondensing a bisphenal of the structure VI

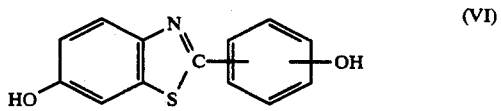
(VI)

with an activated dihalo or dinitro compound derived from the unit

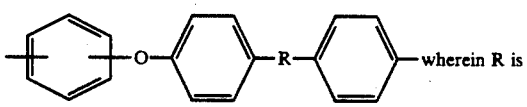 wherein R is

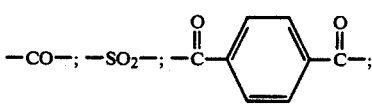

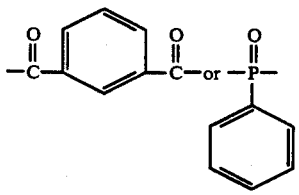

in a polar aprotic solvent at a temperature within the range from 140° to 320° C.

7. A process as claimed in claim 6, wherein the polycondensation is carried out in the presence of a base selected from the group consisting of the alkali metal and alkaline earth metal carbonates.

* * * * *